United States Patent Office 3,406,100
Patented Oct. 15, 1968

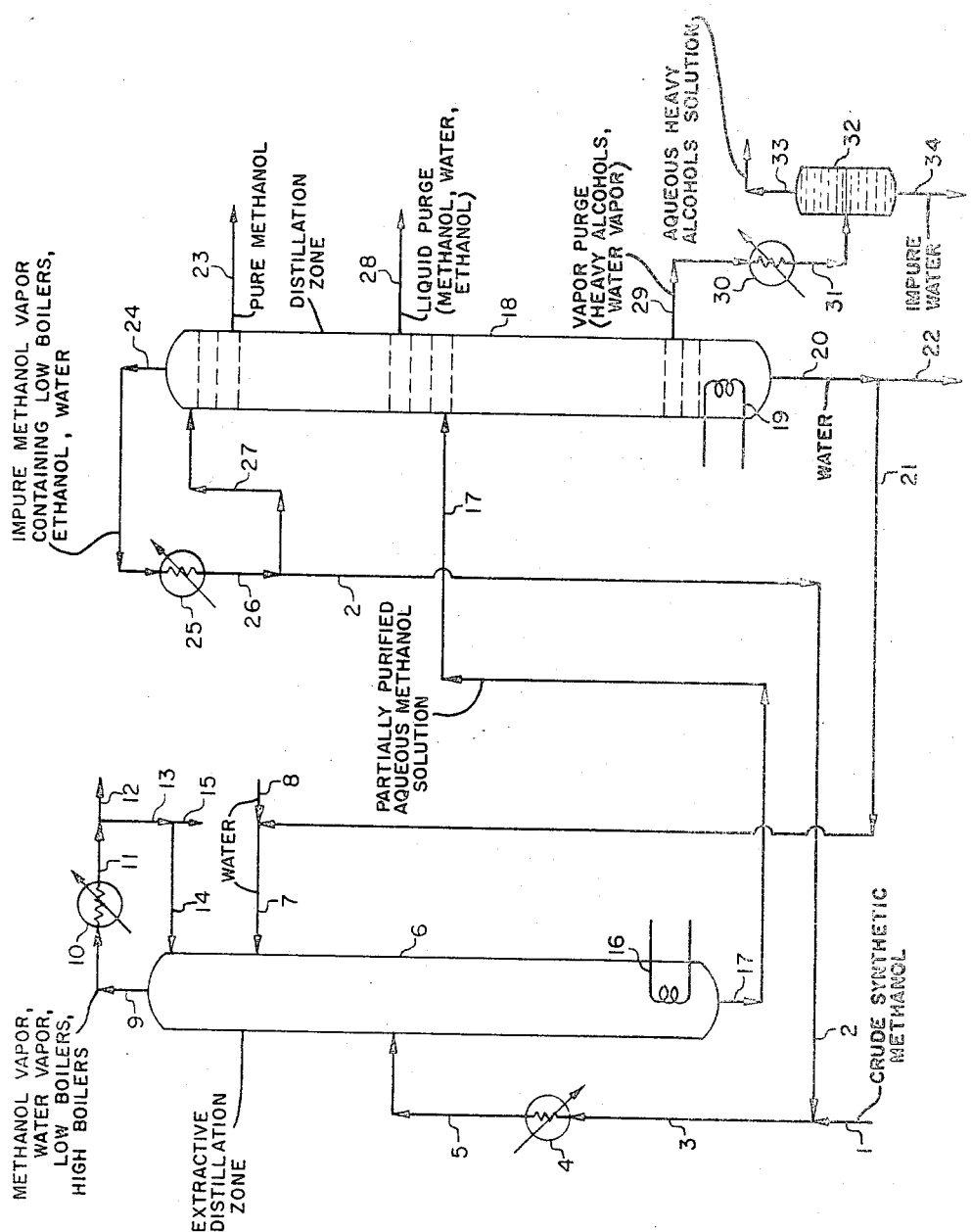

3,406,100
PURIFICATION OF SYNTHETIC METHANOL
BY EXTRACTIVE DISTILLATION AND SUB-
SEQUENT DISTILLATION WITH PLURAL
SIDE STREAM PURGES
Maxim Karafian, Cold Spring Harbor, N.Y., assignor to
Chemical Construction Corporation, New York, N.Y.,
a corporation of Delaware
Filed Dec. 16, 1966, Ser. No. 602,388
10 Claims. (Cl. 203—78)

ABSTRACT OF THE DISCLOSURE

Crude synthetic methanol is purified by water extractive distillation to produce partially purified aqueous methanol solution. The methanol is further purified by being passed to a second distillation zone or column, to produce pure methanol via an upper side draw-off, with bottom water draw-off. The second distillation column is provided with an upper side liquid purge about the point of aqueous methanol solution entry, primarily to remove ethanol; and a lower vapor purge in the lower section and above the point of water removal, to remove ethanol and other higher alcohols. The vapor purge is cooled and condensed, with the formation of a heavy alcohols-rich phase which is recovered as a tails stream, and a water-rich phase.

The present invention relates to the purification of crude synthetic methanol containing low boiling and high boiling impurities including ethanol and higher-boiling alcohols. An improved two-stage distillation procedure is provided, in which the crude methanol stream is initially processed by water extractive distillation to remove most of the low boilers such as ethers, ketones, aldehydes and dissolved gases, and a portion of the high boilers. The resulting partially purified aqueous methanol solution is processed by a novel rectification distillation, to produce highly purified liquid methanol and remove ethanol and higher boiling alcohols without substantial methanol loss. The aqueous methanol solution is passed into the lower section of a distillation column, and pure methanol is removed from the upper portion of the upper enriching zone of the column, with water removal from the bottom of the lower stripping zone. A liquid purge stream of concentrated ethanol content is withdrawn from a section of the enriching zone above the point of entry of the feed stream of aqueous methanol solution, and a vapor purge stream of concentrated content of higher alcohols is withdrawn from the lower stripping section of the column adjacent to the bottom water removal outlet. The combination purge of the present invention results in the production of highly purified methanol with minimal methanol loss in the purge streams.

Crude synthetic methyl alcohol, generally designated as methanol, may be produced by a variety of processes, but is principally obtained by catalytic synthesis from carbon monoxide and hydrogen, or by the partial oxidation of hydrocarbons. The crude material will always contain small amounts of by-product organic compounds such as ethanol; alcohols higher than ethanol in boiling point, known generally as higher or heavy alcohols; ethers; ketones and aldehydes. These organic by-products are usually removed or separated to a major extent from the crude methanol by procedures involving distillation or a sequence of distillation steps, to produce purified methanol. One major approach of the prior art, as shown in U.S. Patents Nos. 3,230,156 and 2,549,290, and Great Britain Patent No. 660,773, involves the concept of water extractive distillation whereby the crude methano is distilled together with a large proportion of water. The presence of excess water breaks the azeotrope of methanol and acetone so that acetone can be separated from methanol. The low boiling ethers, aldehydes and dissolved gases are also removed in the overhead from this column. Thus, a bottoms stream of partially purified dilute aqueous methanol solution is produced by the extractive distillation step. The aqueous methanol solution is generally processed by a second distillation step known as rectification, in which a separation of the purified methanol overhead from water bottoms is obtained by a standard type of selective equilibrium distillation procedure.

An early and somewhat more conventional approach to methanol purification involved a first distillation step in which a limited amount of water is added to the distillation zone. In this case, low boilers are removed overhead with the added water serving to provide a sharper separation. The bottoms stream, consisting of aqueous methanol together with high boilers, is then re-distilled to produce an overhead vapor stream of purified methanol, with a residual bottoms liquid stream containing methanol, impurities and water also being produced. In this sequence, the liquid bottoms stream must be re-distilled in order to recover a methanol-rich fraction which is then recycled.

In these conventional prior art procedures, the rectification or second distillation step is generally carried out by providing a distillation zone in which the aqueous methanol solution feed stream is passed into the middle section of the distillation zone. Purified methanol is withdrawn from the upper section of the distillation zone, while water or aqueous solution is withdrawn from the bottom of the distillation zone, or from the reboiler section. An overhead vapor stream containing residual low boilers is withdrawn from the top of the zone, and is usually cooled and at least partially condensed to provide reflux. Although this procedure produces a purified methanol product suitable for some usages, in many instances a highly purified methanol product is required, and in these cases the methanol produced by rectification must be further purified by additional chemical or physical processes such as contact with a bed of activated carbon and filtration, in order to produce a product of requisite purity.

In the present invention, a highly purified methanol product is produced by the rectification of aqueous methanol solution, without substantial methanol loss, by selective and localized purging of impurities from the distillation zone. It has been determined that this selective purging will serve to remove substantially all of the ethanol and higher boiling alcohols from the system, without a substantial loss of methanol. A very high purity methanol product is produced which usually contains less than 10 p.p.m. of ethanol and only trace amounts of other impurities. The product methanol is thus directly suitable for application in many usages without the additional purification procedures previously required in prior art processes. The procedure of the present invention involves two selective and localized purges from the rectification distillation zone. A liquid purge stream of concentrated ethanol content is withdrawn from a section of the enriching zone, above the point of entry of the feed stream of aqueous methanol solution; and a vapor purge stream of concentrated content of ethanol and higher alcohols is withdrawn from the lower stripping section of the distillation zone, adjacent to the bottom water removal outlet. It has been determined that the procedure of the present invention results in a minimal loss of methanol in the purge streams, and the combination purge of the invention results in the production of highly purified methanol.

It is an object of the present invention to produce high purity methanol from crude synthetic methanol.

Another object is to produce high purity methanol from the aqueous methanol solution obtained by the water extractive distillation of crude synthetic methanol.

A further object is to provide an improved rectification procedure for the production of high purity methanol from aqueous methanol solution.

An additional object is to remove ethanol and higher boiling alcohols from crude synthetic methanol in an improved manner.

Still another object is to selectively purge ethanol and higher boiling alcohols from a distillation zone in which aqueous methanol solution is rectified to produce high purity methanol, without substantial methanol loss.

Still a further object is to provide a combination liquid and vapor purging procedure for the removal of purge streams concentrated in ethanol and higher boiling alcohols from the second stage rectification distillation zone provided in a two stage synthetic methanol purification process.

These and other objects and advantages of the present invention will become evident from the description which follows. Referring to the figure, which is a flowsheet of a preferred embodiment of the invention, a feed stream of crude synthetic methanol is passed into the process via feed stream 1. Stream 1 is typically produced by a high pressure process of synthesis wherein a mixed hydrogen-carbon monoxide gas stream is catalytically converted to methanol. Various by-products including water, ethanol, heavy alcohols or alcohols of higher molecular weight than ethanol, ethers, esters, aldehydes and ketones are also formed during the synthesis. Thus, stream 1 will typically contain about 85% methanol, 10% water, 2% dimethyl ether, and smaller amounts of other organic impurities including ethanol and heavy alcohols. All proportions or compositions specified are by weight percent. The organic impurities may be roughly divided into two groups, "high boilers" and "low boilers," depending on whether the specific compound has a normal boiling point above or below that of methanol. As discussed in detail in British Patent No. 660,773 cited supra, due to the presence of water and other factors such as azeotrope formation, the volatilities of the various components are altered so as to make impossible the complete separation of the organic impurities from the methanol by conventional distillation.

Stream 1 is preferably combined with recycle stream 2, which contains methanol and residual low boilers and is derived from within the process. The combined stream 3 is heated in heat exchanger 4 to a temperature usually in the range of 70° C. to 100° C., and is then passed via stream 5 to the central stction or middle region of a first distillation zone in unit 6, in which water extractive distillation of impurities is carried out at any convenient pressure, usually in the range of substantially atmospheric pressure to 5 kg./sq. cm. absolute pressure. Unit 6 may consist of any convenient apparatus for carrying out a distillation process, such as a vertically oriented tower provided with packing, bubble cap trays, or perforated trays. It should be noted that the recycle stream 2 may be separately passed into unit 6 at a suitable point such as a plate or tray above the entry level of stream 6, however stream 2 will usually be combined with stream 1 in practice. Additionally, stream 5 may be split and fed into unit 6 at two or more points so as to provide more uniform operation of the central section. A portion of stream 5 may be passed into unit 6 above the central section, so as to alter volatilities and thereby improve the separation of high boilers in the central section, as will appear infra.

A feed stream of extractive distillation water is passed into unit 6 via stream 7, at a temperature below that of stream 5 and preferably in the range of 30° C. to 60° C. Water stream 7 is also preferably slightly alkaline in pH, thus sodium hydroxide or other typical alkaline agent is added to stream 7 via stream 8, in order to maintain the system at an alkaline pH, preferably in the range of 7.5 to 9.5. This is done in order to neutralize acids which are present in the crude feed, and thereby permit the use of carbon steel as a material of construction. In addition, an alkaline pH ties up any carboxylic acid which may be present in the form of the equivalent acid salt, which is water-soluble and thus is readily removed from the system in purge water. It should be understood that use of an additive to maintain an alkaline pH may not be necessary in some cases, and further that the alkaline agent, when employed, may be added to other process streams besides stream 7.

The water stream 7 thus passes downwards through unit 6, and is partially vaporized and dilutes the methanol-rich liquid phase, thus altering relative volatilities of impurities. A distillation of low boilers and partial extractive distillation of high boilers takes place within unit 6, due to the presence of the added water stream 7. As a result, the overhead vapor stream 9 removed from the top of unit 6 contains practically all of the low boilers, a portion of the high boilers, and a moderate amount of methanol and water vapor. Stream 9 is cooled and partially condensed in unit 10, and the cooled stream 11 is separated into residual vapor phase 12 and condensed liquid component 13. A portion of stream 13 is refluxed to unit 6 via stream 14, and the balance of stream 13, containing a portion of the low boilers and high boilers together with a small amount of methanol and water, is discarded or passed to storage via stream 15. Residual vapor stream 12 is either discarded, or may be further cooled to a lower temperature level at which dimethyl ether is condensed and recovered as a byproduct liquid cut, with discard of the final vapor phase.

Returning now to unit 6, the ratio of high boilers to methanol decreases from the value in the central region to a low value in the bottom of unit 6. Thus, the lower section of unit 6 serves in effect to strip high boilers from aqueous methanol solution. The distillation effect in unit 6 is maintained by means of the conventional reboiling of bottoms, with heater coil 16 serving as a heat source for vapor generation. Alternatively, a liquid stream may be passed from the bottom of unit 6 to an external reboiler unit, with recycle of heated liquid and vapor to the bottom of unit 6. Boiling aqueous methanol solution is maintained in the bottom of unit 6 at a temperature typically in the range of 80° C. to 110° C. Methanol content in the bottoms will vary from about 15% to 60%. Below 15% methanol solution, no further significant purification benefits are achieved by further dilution, while above 60% methanol solution certain high boiling components have relative volatilities close to that of methanol itself and thus would not move up inside unit 6.

Purified aqueous methanol solution is removed from the bottom of unit 6 via stream 17, and now contains only minor residual amounts of impurities including low boilers, ethanol and higher alcohols. Stream 17 is now passed to a second distillation zone, in which the novel final purification procedure of the present invention is carried out during the separation of water from the purified methanol by use of a rectification-stripping procedure. Stream 17 is passed into the lower section of distillation zone 18, and generally between the upper enriching section and a lower stripping section of zone 18. Unit 18 is usually an apparatus unit similar to unit 6 described supra and is at a pressure level comparable to that in unit 6. In unit 18, separation of water from the purified methanol take place by means of a stripping and rectification type of distillation. In the lower stripping section of unit 18, all residual methanol is stripped from the liquid water phase and passes upwards in the rising vapor phase. The liquid bottoms, consisting essentially of water together with a slight amount of soluble salts and trace amounts of residual organics, is reboiled by heat applied via coil 19 to provide vapor driving force for the operation of unit 18. Alternatively, direct injection of steam could be employed to provide the reboil effect. Final reboiler bottoms are withdrawn via stream 20 at an elevated temperature typically in the range of 100° C. to 120° C., and may be totally or partially discarded after recovery of sensible heat by suitable heat exchange within the process, not shown, such as heat exchange with stream 1. In most cases, particularly where water is comparatively costly, a portion of stream 20 is recycled via stream 21 to form stream 7, while the balance of stream 20 is discarded via stream 22.

The methanol component moves upwards within unit 18 in the vapor phase, and is condensed and concentrated as highly purified anhydrous liquid product in the upper enriching portion of the distillation zone. Product methanol is preferably not withdrawn as overhead vapor from the top of unit 18, due to the concentration of residual low boiling impurities at this point, but instead the product material is removed as a liquid phase side draw at a temperature of about 65° C. to 75° C. via stream 23, which is located at a point somewhat below the top of the distillation zone, to allow vapor-phase concentration of residual low boilers at the top of unit 18. Stream 23 is cooled and passed to product storage, not shown. In instances when a second product stream of extremely high purity or premium methanol is desired, two upper side draws will be provided from the upper section of unit 18, with the uppermost side draw serving to furnish premium grade product methanol.

An overhead vapor phase 24 containing residual low boilers is withdrawn from the top of zone 18, at a temperature in the range of 65° C. to 75° C. Stream 24 is condensed in cooler 25, and the resulting liquid stream 26 is partially refluxed via stream 27. The balance of stream 26 is recycled via 2 to the first distillation zone. Thus, a net purge of residual low boilers from zone 18 takes place.

In accordance with the present invention, a first purge stream 28 is withdrawn from the liquid phase in the section of zone 18 where ethanol is in highest concentration, at a temperature generally in the range of 70° C. to 85° C., and contains a major portion or all of the ethanol originally contained in stream 17. Stream 28 is removed above the level at which stream 17 is introduced into zone 18, and thus stream 28 will also contain methanol and a proportion of water. Stream 28 will usually be passed to heads storage together with stream 15. In some instances, as when it is required to produce very high purity or premium grade methanol via stream 23, the quantity of purge drawoff via stream 28 will be relatively large, so as to greatly depress impurity concentration in the middle section of zone 18. In this case, methanol may be recovered from stream 28 via an auxiliary distillation of stream 28, not shown, and recycled to the middle or upper section of zone 18.

In combination with the drawoff of stream 28 from the middle section of zone 18, so as to remove ethanol impurity from the system, a second purge stream drawoff is provided to remove heavy or higher boiling alcohols from distillation zone 18. Thus, a second purge stream 29 is withdrawn from the vapor phase in the lower section of zone 18, at a temperature generally in the range of 95° C. to 120° C. Stream 29 is removed as a vapor stream adjacent to and above the level at which water is withdrawn from the lower section, and it has been determined that the vapor drawoff of stream 29 will contain substantially all of the heavy alcohols originally contained in stream 17, and thus the removal of vapor stream 29 serves to remove heavy alcohols from the system. Stream 29 may be flared or vented through a flame arrestor for discard to atmosphere, however the heavy alcohols in stream 29 have an economic value and will usually be recovered and passed to storage. In this case, stream 29 is cooled in cooler 30, generally to a temperature below 60° C., to produce condensation of the vapor drawoff to liquid. The resulting liquid stream 31 is passed into separator vessel 32, and separates into a heavy alcohols-rich phase and a water-rich phase. The heavy alcohols-rich pase is recovered from vessel 32 as tails stream 33 and passed to storage, while the water-rich phase is discharged from vessel 32 as stream 34 which is discarded.

Numerous alternatives within the scope of the presennt invention, besides those mentioned supra, will occur to those skilled in the art. The ranges of process variables such as temperature and pressure enumerated supra preferred embodiments of the invention for optimum utilization of the process concepts of the invention, and thus the invention may be practical outside of these ranges in suitable instances. Other types of initial processing of the crude synthetic methanol stream may be provided in practice, instead of the water extractive distillation procedure described supra. Thus, in some instances, a water extractive distillation procedure of the type described in U.S. Patent No. 3,230,156 may be provided in practice. In any case, the rectification distillation procedure of the present invention provides an improved and highly effective process for producing high purity methanol from partially purified aqueous methanol solution produced by any type of initial water extractive distillaution.

Stream 2 may be passed to other utilization or discharged to waste in some instances, instead of being recycled and combined with stream 1. Stream 2 is pure enough to be utilized as a co-product of the process in some cases. As described supra, stream 23 may in practice be drawn off from unit 18 at a plurality of points, to provide product methanol streams of varying purity including premium grade methanol. Similiarly, the purge streams 28 and 29 may be drawn off as individual purge streams from a plurality of trays at different levels, and thereafter combined to provide total purge streams. Likewise, stream 17 may be passed into unit 18 at a plurality of points, below the level to drawoff of stream 28. Due to impurity content, in some instances it will desirable to omit stream 21 and discharge all of stream 20 via stream 22. In this case, fresh process water substantially free of impurities will be passed into unit 6 via stream 8. As mentioned, supra, reboiler coil 16 may be replaced or supplemented with an external reboiler unit, with drawoff of bottoms liquid to an external heat exchanger in which the liquid is heated and partially vaporized, with recycle of heated liquid and vapor to the bottom of unit 6. Similarly, heating coil 19 in the bottom of unit 18 may be replaced or supplemented with an external reboiler unit in suitable instances.

An example of an industrial application of the process of the present invention to a commercial methanol facility will now be described. In the example infra, a stream of very pure premium methanol, designated as stream 23a, was drawn off from unit 18 above the main drawoff of commercial grade methanol, designated as stream 23b. In addition, all stream flow rates are expressed as mols per hour of the respective components. Finally, stream 23 was passed in heat exchange with stream 20 to produce the heated feed stream 5.

EXAMPLE

| Stream No. | Stream Composition, Mols Per Hour of Component | | | | | | |
|---|---|---|---|---|---|---|---|
| | Carbon Monoxide and Methane | Methanol | Water | Ethanol | Volatile Compounds | Heavy Alcohols | Temp., °C. |
| 1 | 0.70 | 838.87 | 271.46 | 0.65 | 16.23 | 5.23 | 36 |
| 12 | 0.70 | 6.10 | 0.12 | 0.01 | 15.79 | | 36 |
| 15 | | 4.90 | 0.28 | 0.01 | 0.43 | | 36 |
| 23a | | 123.00 | 0.03 | 0.04 | | | 70 |
| 23b | | 697.30 | 0.19 | 0.10 | 0.01 | | 70 |
| 28 | | 6.42 | 1.07 | 0.46 | | | 76 |
| 33 | | 0.76 | 6.40 | 0.01 | | 4.91 | 36 |
| 34 | | 0.28 | 22.23 | 0.02 | | 0.32 | 36 |
| 22 | | 0.01 | 19.14 | | | | 90 |
| 5 | 0.70 | 920.87 | 271.48 | 0.65 | 16.23 | 5.23 | 90 |
| 14 | | 638.30 | 36.40 | 1.30 | 56.00 | | 36 |
| 21 | | 1.72 | 3,150.00 | | | | 54 |
| 17 | | 911.99 | 3,521.08 | 0.63 | 0.01 | 5.23 | 89 |
| 27 | | 3,339.11 | 0.80 | 0.09 | | | 60 |
| 26 | | 3,421.11 | 0.82 | 0.09 | | | 60 |
| 29 | | 1.04 | 28.63 | 0.03 | | 5.23 | 109 |

Unit 6 was maintained with a bottoms pressure of 1.76 kg./sq. cm., a bottoms temperature of 89° C., and a top temperature of 69° C. Unit 18 was maintained with a bottoms pressure of 1.76 kg./sq. cm., a bottoms temperatuer of 111° C., and a top temperature of 69° C.

I claim:

1. In a process for the purification of crude synthetic methanol in which a liquid stream of crude synthetic methanol containing low boiling and high boiling impurities including ethanol and heavy alcohols is subjected to extractive distillation in a first distillation zone, a stream of liquid water is added to the upper portion of said first distillation zone, an overhead vapor stream containing low boiling and high boiling impurities is removed from the top of said first distillation zone, a stream of partially purified aqueous methanol solution containing residual high boiling impurities is withdrawn from the bottom of said first distillation zone, said stream of partially purified aqueous methanol solution is subjected to rectification in a second distillation zone by adding said aqueous methanol solution to the lower section of said second distillation zone, a stream of substantially pure methanol is withdrawn from the upper section of said second distillation zone, a stream comprising water is withdrawn from the bottom of the lower section of said second distillation zone, a methanol vapor stream principally containing methanol and minor amounts of residual low boilers, water and ethanol is withdrawn from the top of said second distillation zone, said methanol vapor stream is cooled and thereby condensed, and at least a portion of the resulting condensed stream principally containing methanol is recycled to said second distillation zone as reflux, the improved process of removing ethanol and heavy alcohols from said second distillation zone without substantial methanol loss and thereby producing a highly purified methanol product which comprises (a) removing a first purge stream from the liquid phase in the middle section of said second distillation zone, said first purge stream principally containing methanol, water and ethanol, and being removed from said second distillation zone above the level at which said aqueous methanol solution is introduced into said second distillation zone, whereby said first purge stream contains a major portion of the ethanol originally contained in said partially purified aqueous methanol solution, and (b) removing a second purge stream from the vapor phase in the lower section of said second distillation zone, said second purge stream principally containing water and heavy alcohols and minor amounts of methanol and ethanol, and being removed from the lower section of said second distillation zone adjacent to but above the level at which water is withdrawn from the lower section, whereby said second purge stream contains substantially all of the heavy alcohols originally contained in said partially purified aqueous methanol solution.

2. The process of claim 1, in which the vapor purge stream of step (b) is cooled and thereby condensed to liquid, whereby the condensed liquid separates into a heavy alcohols-rich phase principally containing heavy alcohols and water and minor amounts of methanol and ethanol, and a water-rich phase principally containing water and minor amounts of methanol, ethanol and heavy alcohols, and the heavy alcohols-rich phase is recovered as a tails stream.

3. The process of claim 2, in which said vapor purge stream is cooled to a temperature below 60° C., to produce condensation to liquid.

4. The process of claim 1, in which a portion of said condensed methanol, produced by cooling the methanol vapor stream withdrawn from the top of said second distillation zone, is recycled to said first distillation zone.

5. The process of claim 1, in which said partially purified aqueous methanol solution contains from about 15% to 60% methanol content and is at a temperature in the range of 80° C. to 110° C., said stream of substantially pure methanol is withdrawn from said second distillation zone at a temperature in the range of 65° C. to 75° C., said stream comprising water is withdrawn from the bottom of the lower section of said second distillation zone at a temperature in the range of 100° C. to 120° C., said methanol vapor stream containing impurities including minor amounts of residual low boilers, water and ethanol is withdrawn from the top of said second distillation zone at a temperature in the range of 65° C. to 75° C., said first purge stream is removed from said second distillation zone according to step (a) at a temperature in the range of 70° C. to 85° C., said second purge stream is removed from said second distillation zone according to step (b) at a temperature in the range of 95° C. to 120° C., and said first and second distillation zones are maintained at a pressure level between substantially atmospheric pressure and 5 kg./sq. cm. absolute pressure.

6. In a process for the purification of synthetic methanol in which a liquid stream of crude synthetic methanol containing low boiling and high boiling impurities including ethanol and heavy alcohols is subjected to extractive distillation in a first distillation zone, a stream of liquid water is added to the upper portion of said first distillation zone, an overhead vapor stream containing low boiling and high boiling impurities is removed from the top of said first distillation zone, a stream of partially purified aqueous methanol solution containing residual high boiling impurities is withdrawn from the bottom of said first distillation zone, said stream of partially purified aqueous methanol solution is subjected to rectification in a second distillation zone by adding said aqueous methanol solution to the lower section of said second distillation zone, a stream of substantially pure methanol is withdrawn from the upper section of said second distillation zone, a stream comprising water is withdrawn from the bottom of the lower section of said second distillation zone, a methanol vapor stream principally containing methanol and minor amounts of residual low boilers, water and ethanol is withdrawn from the top of said second distillation zone, said methanol vapor stream is cooled and thereby condensed, a portion of the resulting condensed stream principally containing methanol is recycled to said second distillation zone as reflux, and the balance of the resulting condensed stream principally containing methanol is recycled to said first distillation zone, the improved process of removing ethanol and heavy alcohols from said second distillation zone without substantial methanol loss and thereby producing a highly purified methanol product which comprises (a) removing a first purge stream from the liquid phase in the middle section of said second distillation zone, said first purge stream principally containing methanol, water and ethanol, and being removed from said second distillation zone above the level at which said aqueous methanol solution is introduced into said second distillation zone, whereby said first purge stream contains a major portion of the ethanol originally contained in said partially purified aqueous methanol solution, (b) removing a second purge stream from the vapor phase in the lower section of said second distillation zone, said second purge stream principally containing water and heavy alcohols and minor amounts of methanol and ethanol, and being removed from the lower section of said second distillation zone adjacent to but above the level at which water is withdrawn from the lower section, whereby said second purge stream contains substantially all of the heavy alcohols originally contained in said partially purified aqueous methanol solution, (c) cooling the vapor purge stream of step (b) to condense said purge stream to liquid, whereby the condensed liquid separates into a heavy alcohols-rich phase principally containing heavy alcohols and water and minor amounts of methanol and ethanol, and a water-rich phase principally containing water and minor amounts of methanol, ethanol and heavy alcohols, and (d) recovering the heavy alcohols-rich liquid phase of step (c) as a tails stream.

7. The process of claim 6, in which the vapor purge stream is cooled in step (c) to a temperature below 60° C., to produce condensation to liquid.

8. The process of claim 6, in which said partially purified aqueous methanol solution contains from about 15% to 60% methanol content and is at a temperature in the range of 80° C. to 110° C., said stream of substantially pure methanol is withdrawn from said second distillation zone at a temperature in the range of 65° C. to 75° C., said stream comprising water is withdrawn from the bottom of the lower section of said second distillation zone at a temperature in the range of 100° C. to 120° C., said methanol vapor stream containing impurities including minor amounts of residual low boilers, water and ethanol is withdrawn from the top of said second distillation zone at a temperature in the range of 65° C. to 75° C., said first purge stream is removed from said second distillation zone according to step (a) at a temperature in the range of 70° C. to 85° C., said second purge stream is removed from said second distillation zone according to step (b) at a temperature in the range of 95° C. to 120° C., and said first and second distillation zones are maintained at a pressure level between substantially atmospheric pressure and 5 kg./sq. cm. absolute pressure.

9. The process of claim 1, in which said first purge stream removed according to step (a) is distilled in a third distillation zone, to produce a concentrated methanol stream of reduced water and ethanol content, and said concentrated methanol stream is recycled to said second distillation zone.

10. The process of claim 6, in which said first purge stream removed according to step (a) is distilled in a third distillation zone, to produce a concentrated methanol stream of reduced water and ethanol content, and said concentrated methanol stream is recycled to said second distillation zone.

References Cited
UNITED STATES PATENTS

| | | | |
|---|---|---|---|
| 2,549,290 | 4/1951 | Congdon et al. | 203—42 |
| 2,610,141 | 9/1952 | Drout | 260—643 |
| 2,612,467 | 9/1952 | Morrell et al. | 203—85 |
| 2,638,440 | 5/1953 | Drout et al. | 203—85 |
| 2,806,816 | 9/1957 | Staib et al. | 260—643 |
| 2,910,412 | 10/1959 | Muller et al. | 203—85 |
| 3,092,667 | 6/1963 | Murphy | 260—643 |
| 3,230,156 | 1/1966 | Katzen | 203—78 |

WILBUR L. BASCOMB, Jr., *Primary Examiner.*